United States Patent Office 3,511,708
Patented May 12, 1970

3,511,708
METHOD FOR DISPLACING LIQUID ORGANIC FILMS FROM SOLID SURFACES
William A. Zisman, Silver Spring, Md., and Marianne K. Bernett, Washington, D.C., assignors to the United States of America as represented by the Secretary of the Navy
No Drawing. Filed Oct. 18, 1966, Ser. No. 588,257
Int. Cl. B08b 7/00; C23g 1/24, 5/02
U.S. Cl. 134—40
3 Claims

ABSTRACT OF THE DISCLOSURE

A nonaqueous liquid surface-active composition for displacing liquid organic films from solid surfaces. The composition is a solution in an aliphatic naphtha of minimum flash point of about 108–140° F. of a small amount of a solute which may be a liquid low molecular weight dimethylsilicone, a liquid linear polyoxyalkylated dimethyl silicone or a liquid methyl ω-trifluoropropyl silicone.

---

The invention described herein may be manufactured and used by or for the Government of the United States of America for governmental purposes without the payment of any royalties thereon or therefor.

This invention relates to a method and compositions for surface-chemical displacing of liquid organic films from solid surfaces. The term film as used herein means a layer of an organic liquid which is physically adsorbed to a solid surface.

The usual procedures presently employed for removing oily films from solid surfaces of electrical, electronic or mechanical equipment involves spraying the solid surfaces with a solvent for the oily material or with an aqueous emulsion which contains a volatile solvent, a penetrant oil and a surface-active agent and functions through surface-chemical activity to displace the oily film.

The solvent film-removing procedure is simply a solvent-washing of the solid surface and depends essentially on the solubility of the oily material in the solvent.

The aqueous emulsion film-removing procedure requires spraying of the emulsion to the solid surface whereby the emulsion is broken on contact with the surface to release the penetrant oil which, with the assistance of the surface-active agent in the water of the emulsion, causes displacement of the oily film from the solid surface. The displacement of the oily film is followed by washing of the solid surface with water to remove residues of the oily film and of the applied emulsion. Optionally, the water-washing step is followed by spraying of a water-displacing composition to remove water from the washed surface.

The above prior art procedures require repeated spraying and, resultingly, the use of large amounts of the solvent or of the aqueous emulsion, as the case may be, to achieve a practical degree of displacement of the oily film from the solid surface. The aqueous emulsion procedure, additionally, has the disadvantage of introducing water which would prove detrimental or injurious in the cleaning of watches, meters and other fine mechanisms, optical equipment with sodium chloride windows, and electrical and electronic equipment containing parts which are damaged by water.

It is an object of the present invention to provide an improved surface chemical method of displacing liquid organic films from solid surfaces using nonaqueous liquid compositions.

It is a further object to provide nonaqueous, surface-active liquid compositions for displacing liquid organic films from solid surfaces.

The above and other objects are accomplished by the method of the present invention in which liquid organic films are displaced from solid surfaces by the application thereto of new liquid surface-active compositions which are nonaqueous organic solutions of a solute in a volatile solvent which is an aliphatic naphtha of minimum flash point of from about 108° F. to 140° F., for example, Amsco No. 140 solvent. The solute, by virtue of its molecular constitution, is an active displacing agent. The new liquid compositions are also effective for displacing films of physically adsorbed water from solid surfaces.

In the practice of the method of the invention, the new liquid surface-active compositions may be applied by various procedures to the solid surfaces from which a liquid organic film is to be displaced, such as by spraying or flushing with the compositions or by dipping or immersing the surfaces in a bath of the compositions, with or without ultrasonic agitation. Sprayed onto the solid surfaces, relatively small volumes of the liquid compositions will effectively displace liquid organic films from the surfaces, for example, a few cubic centimeters per 100 square inches of surface area.

The active liquid organic film-displacing solute in the new liquid surface-active compositions may be a low molecular weight dimethyl silicone, an organosilicone or a fluorosilicone, as hereinafter more fully described. The amount of this solute in the compositions may be varied. In general, amounts of this solute which are in the range of from about 1 to 7% by weight of the compositions will be found effective for surface-chemical displacement of organic liquid films from solid surfaces by the method of the invention.

The method of the invention is effective to displace any liquid organic film from solid surfaces, for example, films of aliphatic and aromatic hydrocarbon oils, liquid fatty acids, liquid alcohols, liquid esters and ketones, etc., from surfaces of solids such as metals, glass, resins and polymers. Particular applications of the method are in the cleaning of oily films from solid surfaces of electrical equipment, such as electric motors, and electronic equipment. When the solute is a low molecular weight dimethyl silicone, the method is also applicable to the cleaning of oily films on optical windows and solid surfaces of watches, meters and other fine mechanisms.

In a single operation, the method displaces the liquid organic film from the solid surface and deposits thereon a monolayer of the solute which prevents respreading of the displaced organic liquid over the solid surface for short periods of time. The rate of displacement of the liquid organic film from the solid surface will depend on the active displacing solute in the compositions and also on the organic liquid of the film to be displaced.

Low molecular weight dimethyl silicones suitable as solutes for the surface-active compositions are liquid linear, branched or cyclic dimethyl silicones, from the dimer through the octamer, of which the linear tetramer is preferred.

Organosilicones suitable as solutes for the surface-active compositions are liquid linear polyoxyalkylated dimethyl silicones of the formula:

$(CH_3)_3SiO[(CH_3)_2SiO]_mSi(CH_3)_2(CH_2)_nO$
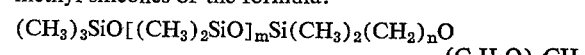
$(C_2H_4O)_xCH_3$ wherein $m$ is an integer from 2 to 6, $n$ is in integer from 1 to 3 and $x$ is a number from 1 to 18, for example, $(CH_3)_3SiO[(CH_3)_2SiO]_6Si(CH_3)_2(CH_2)_3O$
$(C_2H_4O)_{11}CH_3$ Fluorosilicones suitable as solutes for the surface-active compositions are liquid methyl, ω-trifluoropropyl silicones which have a viscosity of from about 100 to 250 centistokes at 25° C. These fluorosilicones contain the repeating unit,

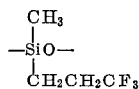

The aliphatic naphtha solvent in the new liquid compositions serves as a convenient means to distribute the solute rapidly over the solid surface and evaporates quickly leaving the surface oil-and-water repellent. While the solutes of themselves will displace liquid organic films from solid surfaces, the solvent serves to reduce the quantity of the solute needed for the film-displacing operation.

The invention is further illustrated by the following specific examples of the new liquid surface-active compositions. Parts are by weight.

EXAMPLE 1

|  | Percent |
|---|---|
| Aliphatic naphtha, 140° F. min. flash pt. | 95 |
| Linear dimethyl silicone tetramer | 5 |

EXAMPLE 2

|  | Percent |
|---|---|
| Aliphatic naphtha, 140° F. min. flash pt. | 95 |
| Linear polyoxyalkylated dimethyl silicone [1] | 5 |

[1] $(CH_3)_3SiO[(CH_3)_2SiO]_6Si(CH_3)_2(CH_2)_3O(C_2H_4O)_{11}CH_3$.

EXAMPLE 3

|  | Percent |
|---|---|
| Aliphatic naphtha, 140° F. min. flash pt. | 95 |
| Methyl, ω-trifluoropropyl silicone, viscosity, 250 centistokes at 25° C. | 5 |

The liquid compositions of the invention, as typified by the above examples, when used for displacing liquid organic films from solid surfaces will provide short term protection against respreading of the displaced organic liquid over the solid surface, for example, for a period of from about 5 to 30 minutes. The respreading can be delayed for long to indefinite periods of time by the inclusion in the liquid surface-active compositions of a small amount, about 0.1% by weight or less of the compositions, of a polar-nonpolar long-chain saturated aliphatic compound which adsorbs to the solid surface to provide a durable olephobic protective coating thereon. Compounds of this kind, as an additional solute in the liquid compositions, are fatty acids of the formula $$CH_3(CH_2)_nCOOH$$

fatty amines of the formula $CH_3(CH_2)_nNH_2$ and fatty acids amides of the formula $CH_3(CH_2)_nCONH_2$, wherein $n$ is an integer from 12 to 30. These compounds may be expressed by the general formula:

$$CH_3(CH_2)_nR$$

wherein R is the —COOH, —NH₂ or —CONH₂ group and include for example, myristic, palmitic, stearic, arachidic and melissic acids, etc.; palmityl-, stearyl- and arachidyl amines and the corresponding amides, etc.

The following specific examples are illustrative of the modified liquid compositions of the invention. Parts are by weight.

EXAMPLE 4

|  | Percent |
|---|---|
| Aliphatic naphtha, 140° F. min. flash pt. | 95 |
| Linear dimethyl silicone tetramer | 4.9 |
| Stearic acid | 0.1 |

EXAMPLE 5

|  | Percent |
|---|---|
| Aliphatic naphtha, 140° F. min. flash pt. | 95 |
| Linear dimethyl silicone tetramer | 4.9 |
| Stearamide | 0.1 |

Since the monolayers deposited by the liquid compositions of the invention are hydrophobic and oleophobic, the compositions can be applied as abhesives, e.g., mold-release agents. The deposited monolayers are effective in preventing or inhibiting subsequent corrosion of steel by the humid atmosphere.

While the invention has been described herein with reference to certain specific embodiments thereof, these are intended by way of illustration and not in limitation except as may be defined in the appended claims.

What is claimed and desired to be secured by Letters Patent of the United States is:

1. A method of displacing liquid organic films from solid surfaces which comprises applying thereto a liquid surface-active composition consisting essentially of a solution of an aliphatic naphtha of minimum flash point of from about 108° F. to 140° F. and a small amount, from about 1 to 7% by weight, of a solute selected from the group consisting of liquid low molecular weight dimethyl silicones from the dimer through the octamer, liquid linear polyoxyalkylated dimethyl silicones of the formula:

$$(CH_3)_3SiO[(CH_3)_2SiO]_mSi(CH_3)_2$$
$$(CH_2)_nO(C_2H_4O)_xCH_3$$

where $m$ is an integer from 2 to 6, $n$ is an integer from 1 to 3 and $x$ is a number from 1 to 18, and liquid methyl, ω-trifluoropropyl silicones which have a viscosity from about 100 to 250 centistokes at 25° C.

2. A method as defined in claim 1, wherein the solute in the composition is the liquid linear dimethyl silicone tetramer.

3. A method as defined in claim 1, wherein the liquid surface-active composition contains a small amount, up to about 0.1% by weight, of an additional solute of the formula:

$$CH_3(CH_2)_nR$$

wherein R is a member of the group consisting of —COOH, —NH₂ and —CONH₂ radicals and $n$ is an integer from 12 to 30.

References Cited

UNITED STATES PATENTS

| 2,036,848 | 4/1936 | Amthor et al. | 252—171 |
| 2,439,856 | 4/1948 | McGregor et al. | 260—448.2 |
| 2,491,843 | 12/1949 | Wilcock | 260—448.2 |
| 3,105,769 | 10/1963 | Ellerin. | |
| 3,167,514 | 1/1965 | Baker | 252—171 |
| 3,196,027 | 7/1965 | White et al. | |

OTHER REFERENCES

Carrie et al., "Silicones," New Cosmetic Vehicles, Doco Corming Corp. (1954).

LEON D. ROSDOL, Primary Examiner

W. E. SCHULZ, Assistant Examiner

U.S. Cl. X.R.

252—171, 364